Oct. 15, 1929.　　　　E. R. HAND　　　　1,731,377
TIDE INDICATOR
Filed Nov. 23, 1926　　　3 Sheets-Sheet 1
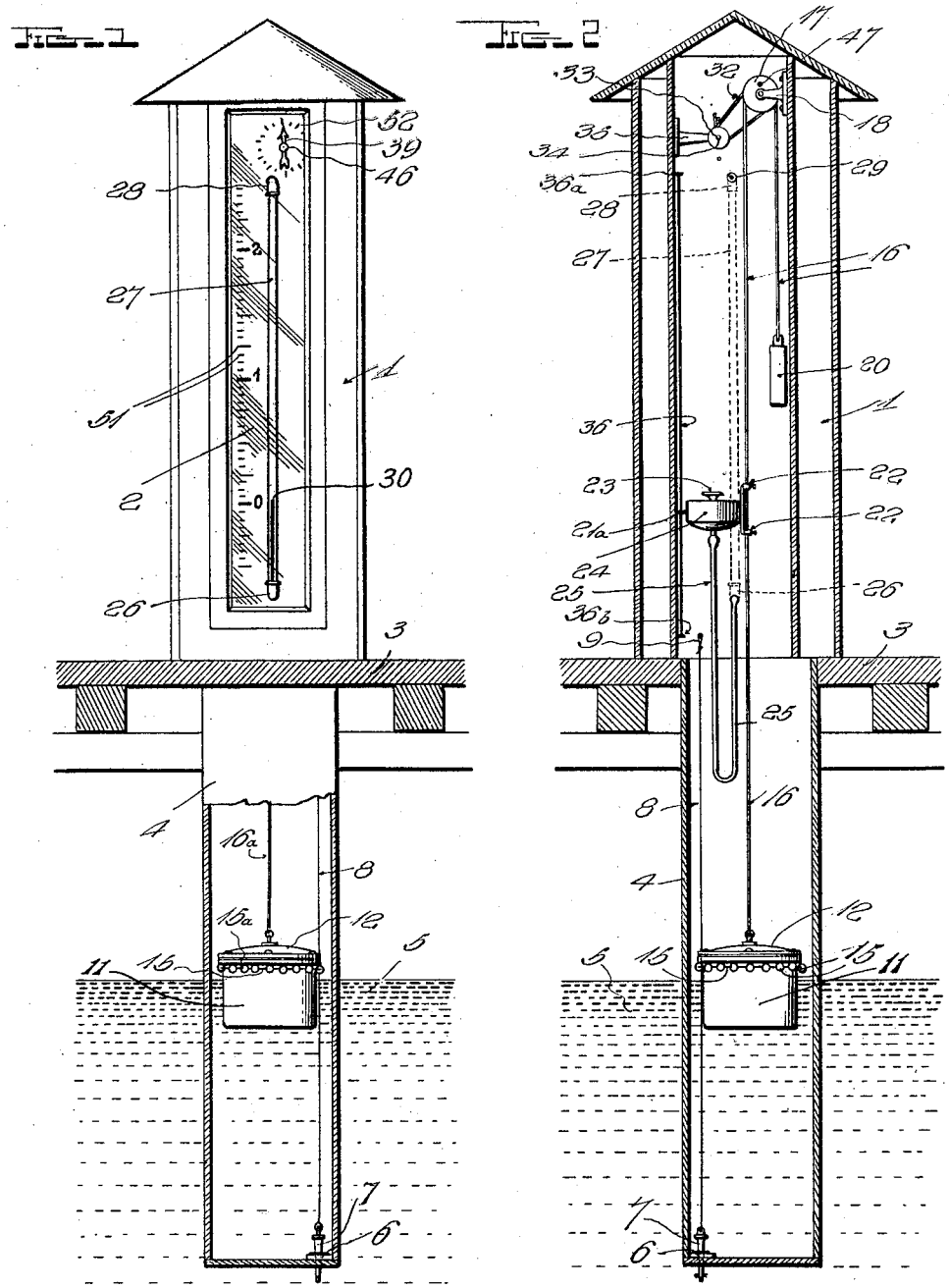
INVENTOR.
Eoline R. Hand,
BY John B. Brady
ATTORNEY

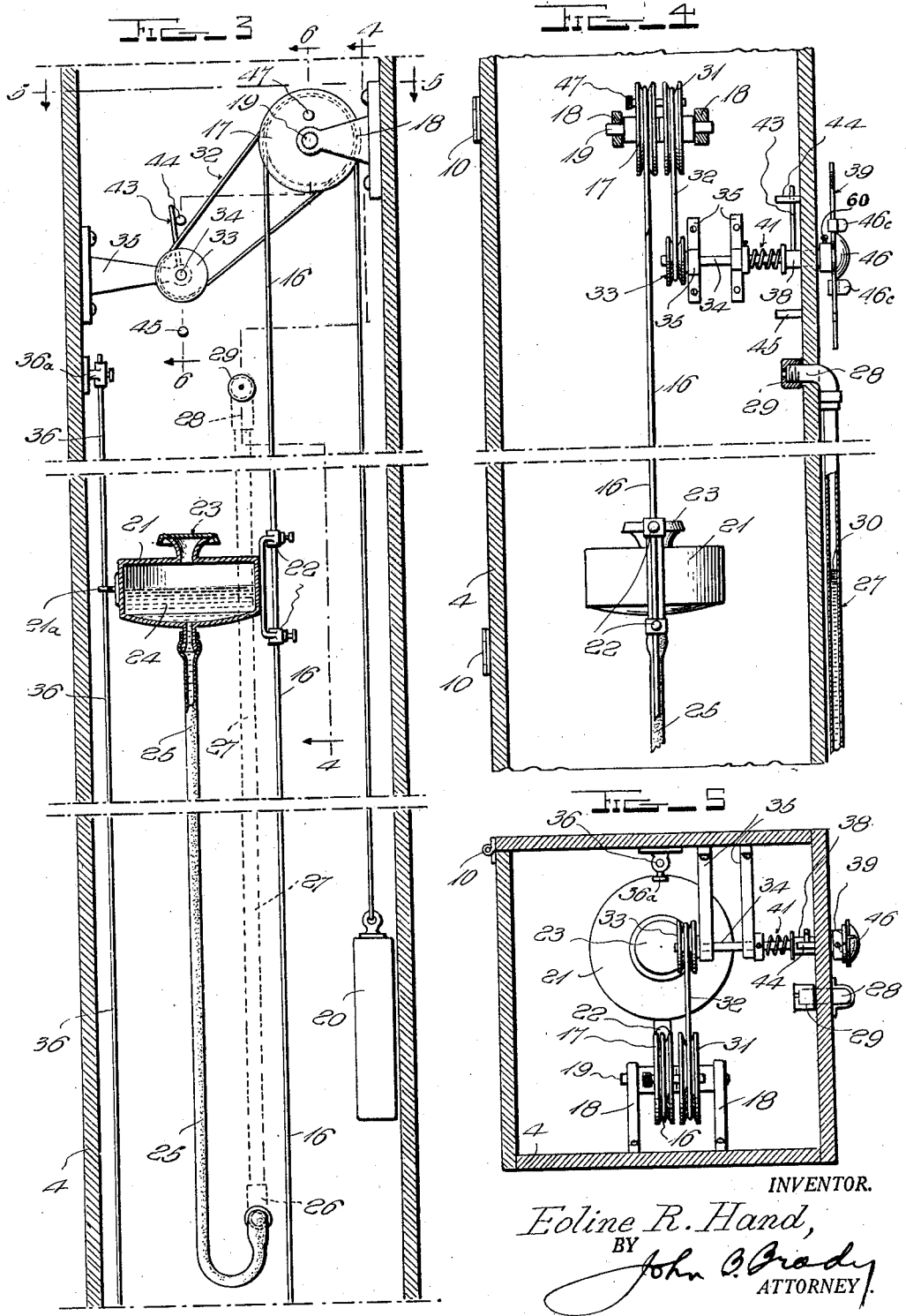

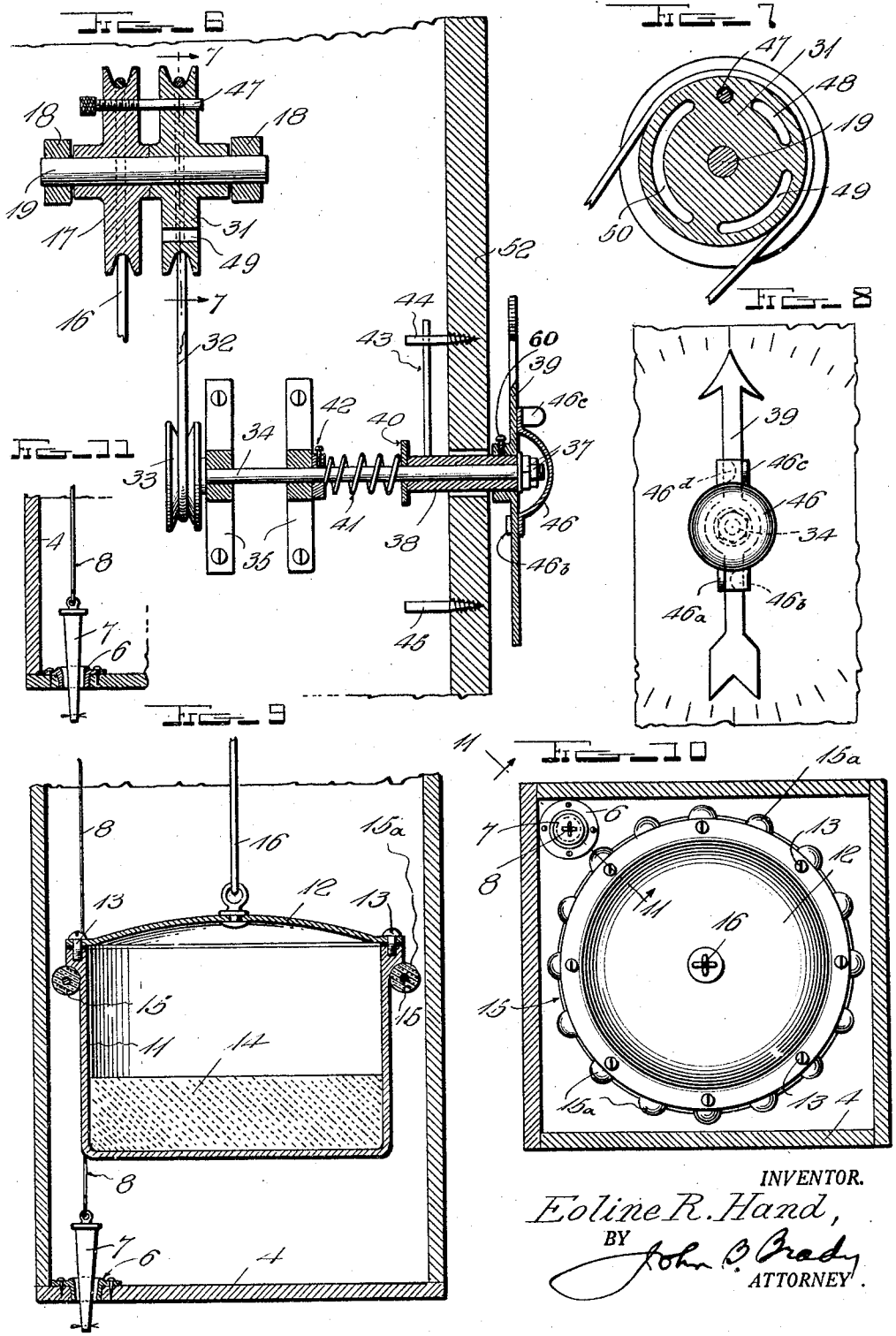

Patented Oct. 15, 1929

1,731,377

UNITED STATES PATENT OFFICE

EOLINE R. HAND, OF TOLEDO, OHIO

TIDE INDICATOR

Application filed November 23, 1926. Serial No. 150,344.

My invention relates broadly to tide indicators and more particularly to a construction of apparatus for indicating the rise and fall of the tide and the movement of the tide at all times.

One of the objects of my invention is to provide a tide indicator which may be readily mounted for observation by the public for determining the ebb and flow of the tide.

Another object of my invention is to provide an apparatus for indicating the condition of the tide having a relatively small number of parts arranged in such manner that operation over long periods of time without breakdown is substantially assured, the parts being extremely simple in their arrangement and practical in construction.

Another object of my invention is to provide an instrument for indicating the condition of the tide, which simultaneously indicates the tide level and the direction of the tide, that is whether the tide is rising or falling.

Still another object of my invention is to provide a tide indicator for the accurate measurement of the condition of the tide independent of local disturbances in the sea adjacent the location of the tide indicator and simultaneously indicating the direction of the flow of the tide.

A still further object of my invention is to provide a tide indicator which may be mounted in any convenient location on a dock or pier out from the shore with a guage glass housed in a suitable kiosk with a column of liquid in the gauge glass, variable in height corresponding to the change in condition of the tide.

Still another object of my invention is to provide an assembly of guide and an auxiliary reservoir which may be moved in accordance with the rise and fall of the sea corresponding to the tide, the auxiliary reservoir operating to control the hydraulic balance of a column of liquid in a gauge glass positioned adjacent the reservoir for accurately indicating the condition of the tide at a point remote from the level of the sea.

Other and further objects of my invention will be understood from the specification hereinafter following by reference to the accompanying drawings in which:

Figure 1 is a front elevation of a kiosk exhibiting the tide indicator of my invention with the operating parts of the float mechanism shown below the kiosk; Fig. 2 is a cross-sectional view looking from the rear of the kiosk and illustrating in elevation the arrangement of the parts of the tide indicator; Fig. 3 is an enlarged foreshortened cross-sectional view of the mechanism of the tide indicator showing the arrangement of the auxiliary reservoir and mechanism for controlling the position thereof in accordance with the condition of the tide; Fig. 4 is a cross-sectional view taken on line 4—4 of Fig. 3 illustrating the arrangement of the gauge glass and auxiliary reservoir and the mechanism for indicating the general direction of the tide; Fig. 5 is a cross-sectional view on line 5—5 of Fig. 3 showing the plan of the assembled mechanism within the tide indicator; Fig. 6 is a fragmentary cross-sectional view of the tide indicator mechanism; Fig. 7 is a cross-sectional view on line 7—7 of Fig. 6 through one of the control pulleys showing the detailed construction of the tide indicating apparatus; Fig. 8 is a detailed front view of the arrow indicator for determining the general direction of the tide; Fig. 9 is an enlarged cross-sectional view through the float and regulating valve of the tide indicator mechanism; Fig. 10 is a plan view of the float illustrated in Fig. 9; and Fig. 11 is a fragmentary cross-sectional view of the regulating valve.

The apparatus of my invention is housed within an ornamental kiosk having a window therein through which the gauge glass and tide indicator are visible to the public. A column of liquid in the gauge glass rising and falling with respect to suitable calibrations adjacent the gauge glass informs the observer as to the condition of the tide. A rotatably mounted arrow designates the direction of the tide, that is whether the tide be rising or falling.

The construction of the apparatus will be more fully understood by a detail reference to the drawings in which reference character 1 designates the kiosk in which the apparatus is housed. The kiosk has a window 2 through which the gauge glass and tide indicator are visible. The kiosk 1 is mounted upon the pier 3 and depending from the kiosk beneath the pier there is a structure 4 which is submerged in the sea 5, the water being admitted to the interior of the structure through port 6, the amount of opening through which is controllable by a tapered valve 7 suspended from cord 8 from a suitable point 9 within the kiosk 1. The regulation of the valve 7 with respect to the port 6 enables the level of the sea 5 within the structure 4 to be maintained independent of local disturbances in the sea adjacent the kiosk. The valve is held against withdrawal by a forelock cotter pin adjacent the small end thereof. Once the proper ingress of water is discovered, no further raising or lowering of the valve is required, except that at times it might be necessary to subject the valve to abrupt vibration to clear the port 6 of dirt.

One side of the kiosk may be provided with a door portion hingedly mounted at 10 to permit ready access to the interior parts of the tide indicator for adjustment or repair. A float 11 is provided in the form of a tank having a cover 12 hermetically sealed thereto and secured by suitable means such as screw members 13 at its periphery. The float 11 may be partially filled with concrete as indicated at 14 for fixing the center of gravity of the float. Surrounding the upper periphery of the float 11, I provide a bronze wire 15 having beads 15$^a$ of glass or other suitable non-corrosive material forming guide means with respect to the interior walls of the structure 4 and preventing inaccuracies in the tide indicator reading due to the tendency of the float to move from side to side and abut against the interior walls of the structure 4.

A flexible cable 16 is secured centrally of the top 12 of the float 11 and extends over the pulley 17 journaled on shaft 19 carried by brackets 18 supported adjacent the interior walls of the kiosk. A weight 20 is connected to the end of the flexible cable 16 serving as a counterbalance for the float 11. A reservoir for liquid is shown at 21 supported on a carriage 22 which is adjustably secured to the flexible cable 16. The reservoir 21 is provided at one side with a guide 21$^a$ arranged to slide along the track 36 secured at opposite ends as represented at 36$^a$ and 36$^b$ to the interior wall of the kiosk. By virtue of the attachment of the reservoir 21 to the flexible cable 16 and the slidable guide 21$^a$ on track 36 the reservoir may be raised and lowered in accordance with the coming in or running out of the tide and the corresponding positions of float 11.

The reservoir 21 contains liquid 24 therein which may be replenished from time to time through the removable cover 23. The reservoir is connected through a flexible tube 25 with the lower end 26 of a gauge glass 27 which is visible through the window 2 in the kiosk 1. Suitable calibrations 51 are marked adjacent the gauge glass 27 and the liquid in the reservoir 21 rises and falls in the gauge glass 27 in such manner that the liquid in the flexible tube 25 and gauge glass 27 seeks the same level and the columns are thus hydraulically balanced at all times. The upper end of the gauge glass 27 terminates at 28 with a cap 29 thereon with breather aperture therein avoiding compression of air within the gauge glass 27.

The level 30 of the liquid 24 in gauge glass 27 will seek the same level as the liquid 24 in reservoir 21. There is little tendency for the liquid in the reservoir 24 to evaporate, but if evaporation does occur the liquid may be replenished from time to time as hereinbefore explained. Journaled upon the shaft 19, I provide an independent pulley 31 which is belt connected at 32 with an auxiliary pulley 33 secured on shaft 34 journaled in brackets 35. The shaft 34 projects through the front of the panel as represented at 52. An indicating arrow 39 is held on outer end of sleeve 38 by a set screw 60. This sleeve 38 and attached arrow 39 are held on shaft 34 against tension of spring 41 by means of lock-nuts 37. A disc member 40 is provided adjacent the end of the sleeve 38 and a collar member 42 is secured to the shaft 34 adjacent the bearing brackets 35. The spring member 41 is interposed between the collar member 42 and the disc member 40 serving to frictionally grip the sleeve 38 into engagement with the drive shaft 34 so that normally upon rotation of pulley 33 the arrow 39 will revolve. It is desirable, however, to provide a slip connection between the arrow 39 and the drive shaft 34 when the arm 43 projecting out from the sleeve 38 abuts against pin members 44 and 45. Movement is therefore possible through an angle of only 180 degrees which is sufficient to indicate the condition of tide running out or tide coming in.

The pulley member 31 is journaled on shaft 19 in such manner that a pin connection 47 may be provided through the pulley members 17 and 31 by the projection of the pin through suitable apertures of differing arcuate lengths as represented at 48, 49 and 50. This arrangement offers a means of linking together the two pulleys 17 and 31 with varying amounts of play, the arcuate apertures being so chosen as to just exceed the amplitude of those slight momentary turns of tide known as seiches. These seiches vary at different ports. At Honolulu, Hawaii, they are approximately twenty minutes apart, and sometimes as much as an inch or more in amplitude. Thus it is seen that the tidal curve is not a smooth curve, except perhaps, in the open sea, but when observed in partly enclosed water always consists of what might be graphically described as a wavy line superimposed upon a curve. Allowance must be made for these secondary curves for otherwise the arrow would be flipping back and forth without giving a true indication. When the proper adjustment is secured the rise and fall of the float 11 causes movement of cable 16 which rotates pulley 17 and simultaneously drives pulley 31, which is in turn connected to drive pulley 33. The initial movement of the cable 16 in an upward direction thereby effects partial rotative movement of arrow 39 giving indication that the tide is running in by movement of the arrow 39 into a position where the end of the arrow points upwardly. Continued rotation of pulley 31 by virtue of the continued upward movement of cable 16 over pulley 17 continues to revolve pulley 33 and shaft 34, but further movement of the arrow 39 is arrested by the abutment of arm 43 against limiting stop 44.

A dome or hub cap 46 is secured over the central portion of the arrow 39 by means of lug members 46$^b$ and 46$^d$ which are bent beneath the arrow 39, corresponding lugs 46$^a$ and 46$^c$ being struck upwardly to permit the manual manipulation of the arrow 39 where it may be necessary. The dome 46 is thereby readily removable to permit access to the nut 37 for the disassembly of the sleeve 38 and arrow 39.

The arrangement of the kiosk and gauge glass 27 on a pier or dock over the sea and the rise and fall of the liquid in the gauge glass 27 conveys the impression that the liquid which is observed in the gauge glass is actually the sea water. As will be understood from the foregoing specification, the liquid which is in the gauge glass is actually liquid contained in the auxiliary reservoir system and not the sea water.

The public in viewing the kiosk may observe from arrow 39 whether the tide is coming in or the tide is running out, while by observing the level of the liquid in the gauge glass 27 the height of the tide in feet and fractions of feet may be accurately read.

I find that it is desirable to have as large a ratio as practicable between the surface area of the liquid in the gauge glass 27 and in the tank or reservoir 21. I have successfully operated a tide indicator according to my invention where this ratio is 1:100. There is a theoretical error in the operation of this type of gauge, but with a large ratio between the two surface areas (tank and gauge glass) it is of no practicable importance. With a 1:100 ratio, if a mark is made on the tank, and the water level in gauge glass noted, and then the tank carefully raised a distance of exactly one foot, the water fails to rise one foot in the gauge glass by exactly one-hundredth (1/100) of a foot, which is of course of no importance to the public.

While I have described my invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. A tide indicator comprising a frame structure, a gauge glass mounted on said frame structure, a reservoir for liquid, a flexible tubular connection between said reservoir and the lower end of said gauge glass, a pulley member mounted on said frame structure, a flexible cable thereover, engaging said pulley member, a float connected to the one end of said cable and a counter-weight connected to the other end of said cable, said reservoir being mounted on said cable intermediate the ends thereof, said float being arranged to rise and fall with the tide for imparting corresponding movements to said reservoir and varying the level of liquid in said gauge glass for observing the condition of the tide.

2. A tide indicator comprising a frame structure, a pulley member rotatably mounted on said frame structure, a flexible cable passing over said pulley member, a counter-weight on one end of said cable and a float on the other end thereof, a gauge glass supported by said frame structure having the upper end thereof open to the atmosphere, a movable reservoir for liquid, a flexible tubular connection from said reservoir to the other end of said gauge glass, means for guiding said reservoir in a vertical path parallel to said gauge glass, and a connection between said flexible cable and said reservoir for controlling the position of said reservoir in accordance with the change in position of said float corresponding to the rise and fall of the tide for varying the level of the liquid in said gauge glass.

3. A tide indicator comprising a frame structure in the form of a kiosk having an apertured depending portion extending into the sea, a flexible cable suspended from said frame structure, a pulley over which said cable is movable, a float controllable by the rise and fall of the tide and secured to said cable, a gauge glass carried by said frame structure, a flexible tubular member connected at one end to said gauge glass and normally filled with liquid, a connection between the other end of said flexible tubular member and said cable whereby the rise and fall of the float will be indicated by the liquid in said gauge glass, the depending portion of said kiosk surrounding said float for admitting sea water thereto in accordance with the normal level of the sea while preventing the transfer of local disturbances to said float.

4. A tide indicator comprising a frame structure, a gauge glass supported from said frame structure, a movable reservoir for liquid, a flexible tubing connecting said reservoir and said gauge glass, means for elevating and lowering said reservoir in accordance with the rise and fall of the tide, and a rotary indicator controlled by the movement of said means for representing the condition of the tide running in or the tide running out.

5. A tide indicator comprising a frame structure, a gauge glass carried by said frame structure, a movable liquid reservoir, a flexible tubing connecting said reservoir to said gauge glass, a float controllable with the rise and fall of the tide, an angularly movable indicator mounted on said frame structure, a flexible cable interconnecting said reservoir and said float, said reservoir raising and lowering in position in accordance with the rise and fall of the float for correspondingly changing the liquid level in said gauge glass, said indicator being angularly movable under control of the rise and fall of said float through an angle of substantially 180 degrees by a change in direction of movement of said reservoir for representing the condition of tide running in or tide running out.

6. A tide indicator comprising a frame structure, a gauge glass carried by said frame structure, a movable liquid reservoir, a flexible tubing connecting said reservoir to said gauge glass, means for raising and lowering said reservoir in position in accordance with the rise and fall of the tide for correspondingly changing the liquid level in said gauge glass, an indicator journaled on said frame structure and rotatable through an angle of substantially 180 degrees under control of the movement of said reservoir, and separate means for imparting movement to said indicator in accordance with the movement of said reservoir for representing the condition of tide running out and tide running in.

7. In a tide indicator, a float arranged to rise and fall with the tide, a member journaled for rotation in accordance with the movement of said float, motion imparting means extending between said float and said member, an indicator arranged for movement between limits of an angle of substantially 180 degrees, and a frictional connection between said rotatable member and said indicator whereby said rotatable member moves in accordance with the rise and fall of the tide while said indicator moves between predetermined limits for representing a condition of tide running out or tide running in, and a variable gauge actuated by the rise and fall of said float for indicating the relative positions of said float in accordance with the height of the tide.

8. In a tide indicator, the combination of a frame structure, a rotatable shaft member journaled on said frame structure, a float arranged to rise and fall with the tide, driving means connected between said float and said shaft member for imparting rotary motion to said shaft member upon movement of said float, and an indicator frictionally carried upon said shaft and movable between predetermined limits under control of said shaft for representing a condition of tide running in and tide running out, and a variable gauge actuated by the rise and fall of said float for indicating the relative positions of said float in accordance with the height of the tide.

9. A tide indicator comprising a frame structure, a rotatable shaft member journaled on said frame structure, a float arranged to rise and fall with the tide, a flexible driving connection between said float and said shaft member for imparting rotary motion to said shaft member, an indicator frictionally carried upon said shaft and movable through predetermined limits of substantially 180 degrees, said indicator being arranged to change its position under conditions of tide running in and tide running out while slipping with respect to said rotatable shaft during continued rise and fall of said float, and a variable gauge actuated by the rise and fall of said float for indicating the relative positions of said float in accordance with the height of the tide.

In testimony whereof I affix my signature.

EOLINE R. HAND.